(12) United States Patent
Yoon et al.

(10) Patent No.: US 9,771,039 B2
(45) Date of Patent: Sep. 26, 2017

(54) VEHICLE FRONT STRUCTURE

(71) Applicants: Hyundai Motor Company, Seoul (KR); Kia Motors Corporation, Seoul (KR); Lotte Chemical Corporation, Seoul (KR)

(72) Inventors: Jin Young Yoon, Gyeonggi-do (KR); Dong Eun Cha, Gyeonggi-do (KR); Tae Hyung Kim, Incheon (KR); Hyun Gyung Kim, Gyeonggi-do (KR); Choul Won So, Daejeon (KR); Jun Youp Kim, Daejeon (KR)

(73) Assignees: Hyundai Motor Company, Seoul (KR); Kia Motors Corporation, Seoul (KR); Lotte Chemical Corporation, Seoul (KR)

(*) Notice: Subject to any disclaimer, the term of this patent is extended or adjusted under 35 U.S.C. 154(b) by 0 days.

(21) Appl. No.: 15/064,238

(22) Filed: Mar. 8, 2016

(65) Prior Publication Data

US 2017/0096116 A1   Apr. 6, 2017

(30) Foreign Application Priority Data

Oct. 1, 2015   (KR) .................. 10-2015-0138555

(51) Int. Cl.
*B60R 19/12* (2006.01)
*B60R 21/34* (2011.01)
*B60R 19/03* (2006.01)
*B60R 19/24* (2006.01)

(52) U.S. Cl.
CPC .............. *B60R 19/12* (2013.01); *B60R 19/03* (2013.01); *B60R 21/34* (2013.01); *B60R 2019/247* (2013.01)

(58) Field of Classification Search
CPC ....... B60R 19/02; B60R 19/023; B60R 19/12; B60R 19/18; B60R 19/34; B60R 21/34
USPC .................. 293/117, 120, 122, 146, 155
See application file for complete search history.

(56) References Cited

U.S. PATENT DOCUMENTS

2015/0001863 A1   1/2015   Cha et al.

FOREIGN PATENT DOCUMENTS

| JP | 2007-055543 A | 3/2007 |
|---|---|---|
| KR | 10-2011-0049297 A | 5/2011 |
| KR | 10-2012-0010500 A | 2/2012 |
| KR | 2012-0058347 A | 6/2012 |
| KR | 10-2012-0076234 A | 7/2012 |

(Continued)

OTHER PUBLICATIONS

English translation of KR 10-2012-0010500; retreived Feb. 21, 2017 from KIPRIS located at http://eng.kipris.or.kr/enghome/main.jsp.*

(Continued)

*Primary Examiner* — Jason S Daniels
(74) *Attorney, Agent, or Firm* — Mintz Levin Cohn Ferris Glovsky and Popeo, P.C.; Peter F. Corless

(57) ABSTRACT

A vehicle front structure is provided. The vehicle front structure includes a front bumper beam having a plurality of brackets that extend in the downward direction of a vehicle and coupling components that protrude forward from ends of the respective brackets. A stiffener is horizontally disposed on the coupling components and vertical pins vertically pass through the stiffener from the coupling components.

9 Claims, 3 Drawing Sheets

(56) References Cited

FOREIGN PATENT DOCUMENTS

| KR | 2014-0057699 A | 5/2014 |
| KR | 2014-0124982 A | 10/2014 |

OTHER PUBLICATIONS

English translation of KR 10-2012-0076234; retreived Feb. 21, 2017 from KIPRIS located at http://eng.kipris.or.kr/enghome/main.jsp.*

* cited by examiner

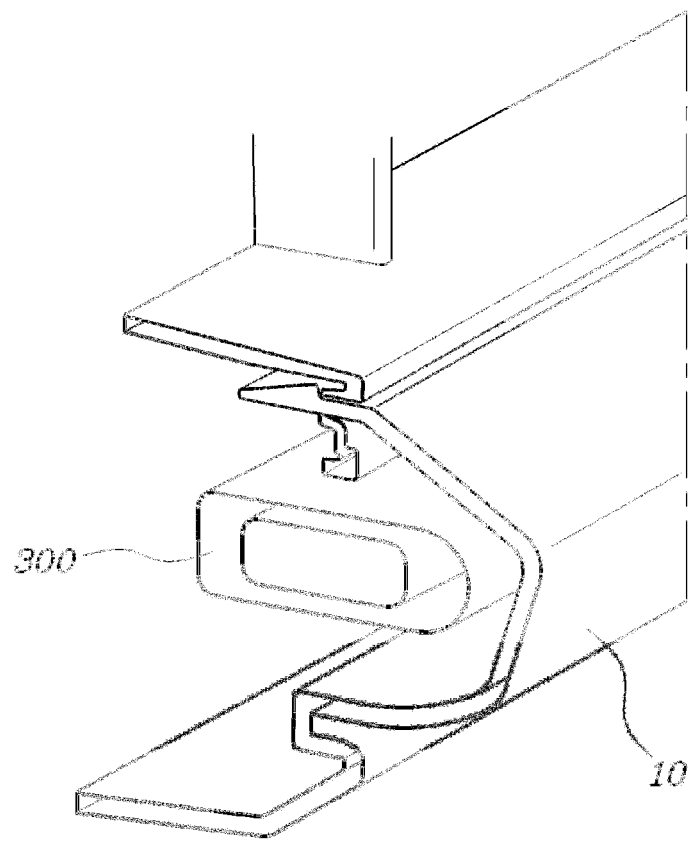
FIG. 6
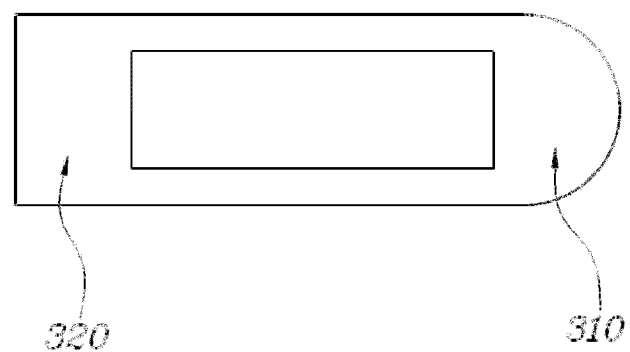

VEHICLE FRONT STRUCTURE

CROSS-REFERENCE TO RELATED APPLICATION

This application claims the priority benefit of Korean Patent Application No. 10-2015-0138555, filed on Oct. 1, 2015 in the Korean Intellectual Property Office, the disclosure of which is incorporated herein by reference.

BACKGROUND

1. Field of the Invention

The present invention relates to a vehicle front structure in which a stiffener collides with pedestrian's legs when the front part of a vehicle that collides with a pedestrian is coupled with a front bumper beam via vertical pins that vertically pass through the stiffener. An impact generated by collision with the pedestrian is transmitted to the stiffener to protect the pedestrian and passengers within the vehicle.

2. Description of the Related Art

Generally, when a vehicle collides with a pedestrian, a stiffener collides with the pedestrian's legs. In a conventional stiffer, fixing pins that fix the stiffener to a front bumper beam that extends components of the front bumper beam connected to the stiffener are coupled horizontally with the stiffener. Therefore, a transmission direction of impact, generated by collision with the pedestrian, to the stiffener and a passing direction of the fixing pins through the stiffener are the same. In particular, the transmission direction of impact to the stiffener and the passing direction of the fixing pins through the stiffener are substantially equivalent. Accordingly, the stiffener may not sufficiently absorb and distribute the impact and, the pedestrian's legs may be injured or the extending parts of the front bumper beam may be damaged.

The above information disclosed in this section is merely for enhancement of understanding of the background of the invention and therefore it may contain information that does not form the prior art that is already known in this country to those of ordinary skilled in the art.

SUMMARY

The present invention provides a vehicle front structure in which a stiffener colliding with pedestrian's legs when the front portion of the vehicle collides with a pedestrian is coupled with a front bumper beam via vertical pins that vertically pass through the stiffener. Additionally, an impact generated by collision with the pedestrian may be transmitted to the stiffener to provide protection for the pedestrians and passengers within the vehicle.

In accordance with one aspect of the present invention, the above and other objects may be accomplished by the provision of a vehicle front structure including a front bumper beam that may have a plurality of brackets that extend in the downward direction of a vehicle, coupling components that protrude forwards from ends of the respective brackets, a stiffener horizontally disposed on the coupling components, and vertical pins that vertically pass through the stiffener from the coupling components.

The coupling components may be formed in a band type that surrounds the stiffener and may be detachably attached to the brackets. The vertical pins may be first vertical pins that pass through a first side of each of the first coupling components, then sequentially pass through the stiffener and a second side of each of the first coupling components, and protrude to the exterior. The first vertical pins may be formed in the shape of a bolt and first nuts may be coupled with the ends of the first vertical pins protruding to the exterior after the vertical pins pass through the first coupling components. The coupling components may be second coupling components formed integrally with the brackets and bent vertically forwards from the ends of the brackets. The vertical pins may be second vertical pins fixed to the second coupling components that extend upwards. The second nuts may be coupled with the ends of the second vertical pins that protrude to the exterior after passing through the stiffener. Further a fixing plate may be disposed between the stiffener and the second nut.

The stiffener may include a reinforced fiber material and may be formed in a hollow pipe shape. The cross-section of the stiffener vertical to the length direction may be divided into a front portion and a rear portion based on the vehicle and the front portion may have a shape having a designated curvature. The thickness of the front portion may be greater than the thickness of the rear portion. The stiffener may be attached proximate to the brackets and the coupling components.

BRIEF DESCRIPTION OF THE DRAWINGS

The above and other objects, features and other advantages of the present invention will be more clearly understood from the following detailed description taken in conjunction with the accompanying drawings, in which:

FIG. 5 is an exemplary view illustrating a bumper cover and a stiffener in accordance with an exemplary embodiment of the present invention; and FIG. 6 is an exemplary cross-sectional view of the stiffener in accordance with an exemplary embodiment of the present invention.

DETAILED DESCRIPTION

Figure 1:
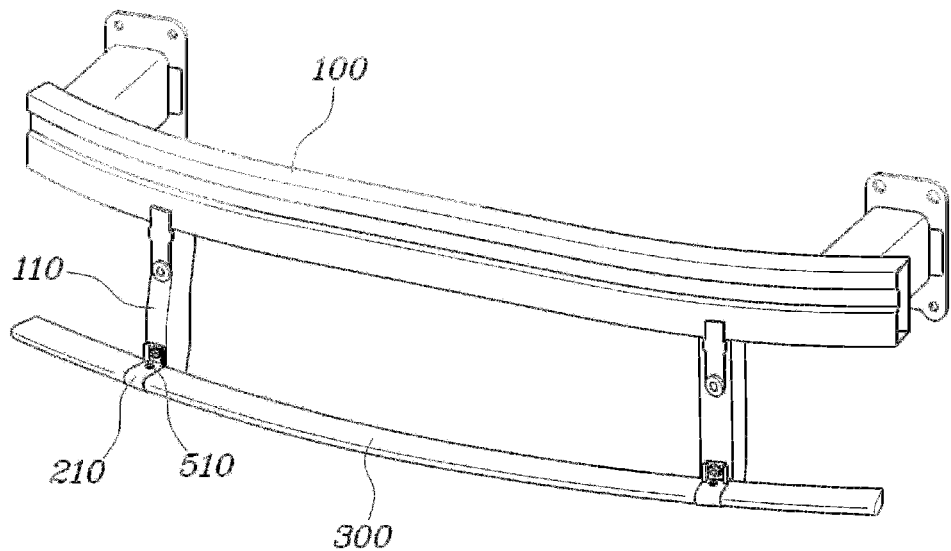
FIG. 1 is an exemplary perspective view illustrating a vehicle front structure in accordance with an exemplary embodiment of the present invention.
Figure 2:
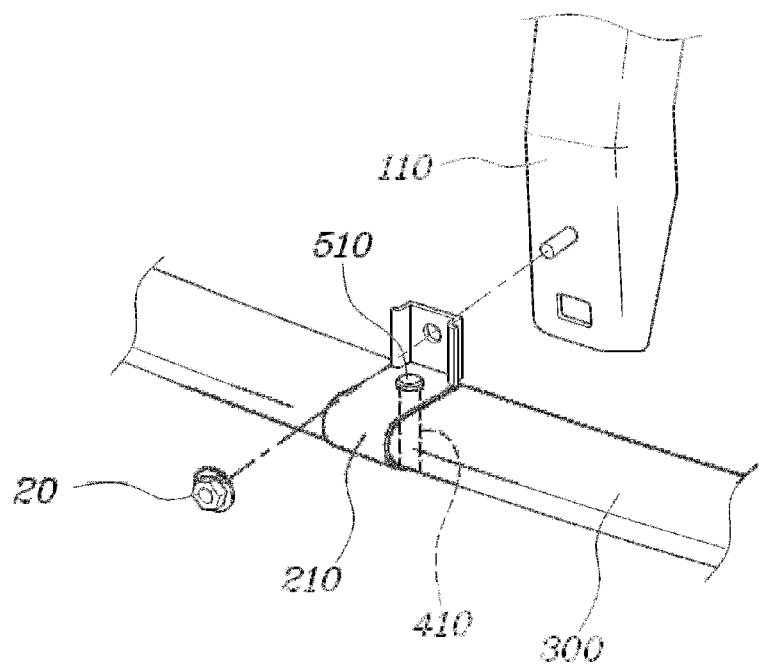
FIG. 2 is an exemplary view illustrating a coupling part in accordance with an exemplary embodiment of the present invention.
Figure 3:
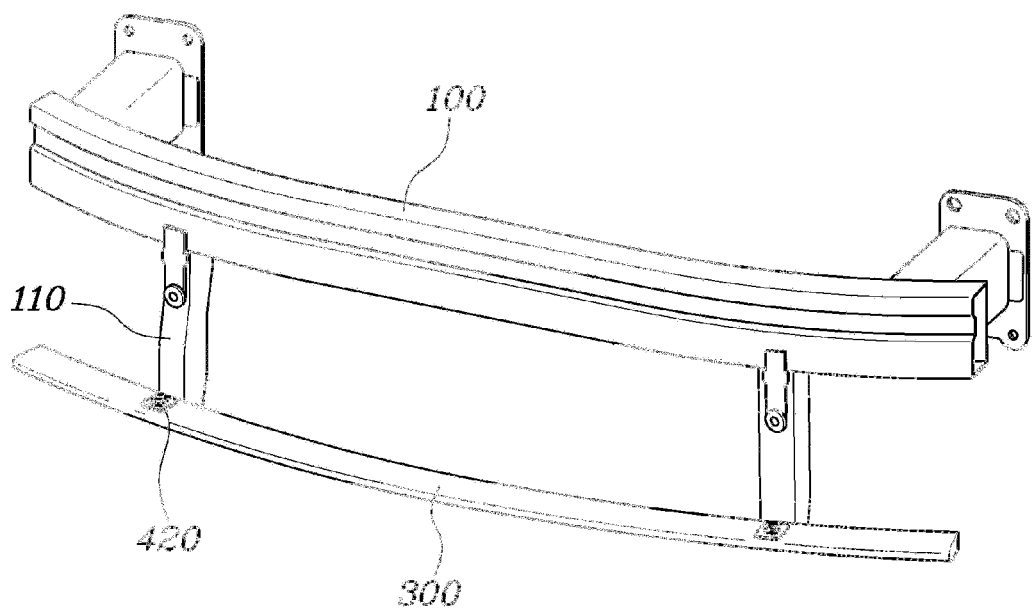
FIG. 3 is an exemplary perspective view illustrating a vehicle front structure in accordance with an exemplary embodiment of the present invention.
Figure 4:
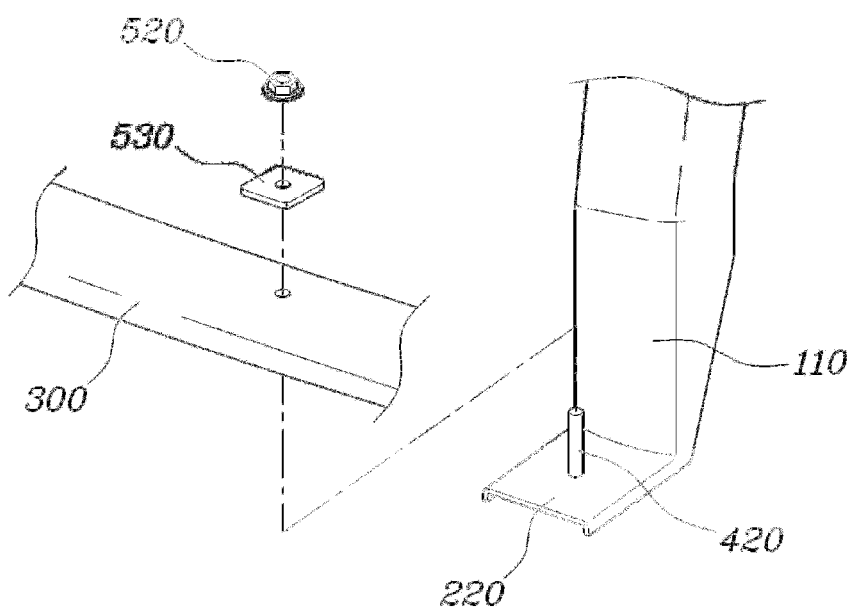
FIG. 4 is an exemplary view illustrating a coupling part in accordance with an exemplary embodiment of the present invention.

Reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. Wherever possible, the same reference numbers will be used throughout the drawings to refer to the same or like parts.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A vehicle front structure in accordance with an exemplary embodiment may include a front bumper beam 100 that has a plurality of brackets 110 that extend in the downward direction of a vehicle, a plurality of coupling components 200 that protrude forward from ends of the respective brackets 110, a stiffener 300 horizontally seated on the coupling components 200, and vertical pins 400 that vertically pass (e.g., extend) through the stiffener 300 from the coupling components 200.

The brackets 110 may be provided in plural and may extend in a downward direction from the front bumper beam 100. In particular, as shown in FIG. 1, a pair of brackets 110 may extend in the downward direction of the vehicle and may be formed at the ends of both sides of the front bumper beam 100. The coupling components 200 may extend in the forward direction of the vehicle and may be connected to the ends of the brackets that extend in a downward direction 110. In accordance with one exemplary embodiment, the coupling components 200 that extend from the ends of the respective brackets 110 may have a shape that is bent in a forward direction from each bracket 110, or a hook shape that extends from each bracket 110 and may include a horizontally formed aperture.

The stiffener 300, that may impact (e.g., collide with) a pedestrian's legs (particularly, shins under the knees) when the front portion of the vehicle collides with a pedestrian, may be disposed on the coupling components 200. The stiffener 300 may include a reinforcing member positioned beneath (e.g., under) the front portion of a front end module (FEM) that forms the vehicle front structure. The stiffener 300 may uniformly transmit an impact, generated by collision of the front portion of the vehicle with a pedestrian, to a plurality of regions of the front end module to thereby protect passengers within the vehicle. Further, the stiffener may be deformed during a collision with the pedestrian and may absorb the impact energy to thereby protect the pedestrians. Accordingly, the stiffener 300 may provide sufficient strength and improved impact absorption. When the stiffener 300 is formed of reinforced fiber, for example, carbon fiber, the stiffener 300 may have sufficient strength and achieve reduced weight, as compared to the stiffener 300 formed of metal in the related art, thus providing an increase in fuel efficiency.

Further, when the front portion of the vehicle collides with a pedestrian at or greater than a designated speed, the stiffener 300 may be configured to absorb the impact and may fracture due to brittleness of carbon fiber, which provides protection of the pedestrian's legs. Further, the stiffener 300 may have a hollow pipe shape to absorb impact.

In accordance with an exemplary embodiment, when the coupling components 200 have a shape bent in a forward direction from the respective brackets 110, the stiffener 300 may be coupled with the coupling components 200 and may be seated on the upper surfaces of the coupling components 200. When the coupling components 200 have a hook shape that extends from the respective brackets 110 and have a horizontally formed aperture, the stiffener 300 may be coupled with the coupling components 200 and may pass through the apertures of a pair of the coupling components 200. The vertical pins 400 may extend vertically from the coupling components 200 and pass through the stiffener 300 seated on the coupling components 200, and thus may connect the coupling components 200 to the stiffener 300.

As described above, when the vehicle collides with a pedestrian, the stiffener 300 impacts the pedestrian's legs. For example, the fixing pins couple the stiffener 300 to the front bumper beam 100 when the portions that extend from the front bumper beam 100 are connected to the stiffener 300 are not vertically coupled with the stiffener 300, as described above, but are horizontally coupled with the stiffener 30. In particular, the transmission direction of impact, that may be generated the by collision with the pedestrian, to the stiffener 300 and the passing direction of the fixing pins through the stiffener 300 may be substantially the same.

Therefore, the impact generated by collision may not be distributed to the stiffener 300 but may be transmitted to the portions that extend from the front bumper beam 100 along the fixing pins. Accordingly, portions that extend may be fractured and separated from the stiffener 300, or may be warped to prevent the stiffener 300 from the typical impact absorbing function. Furthermore, the safety of pedestrians and the safety of passengers in the vehicle may be compromised.

In accordance with the present invention, when the coupling components 200 and the stiffener 300 are connected via the vertical pins 400 that vertically pass through the stiffener 300, the impact generated when the vehicle collides with a pedestrian may be prevented from being transmitted to the coupling components 200. However, the impact may be transmitted to the stiffener 300 and thus, the stiffener 300 may absorb the impact. When the stiffener 300 is formed of steel, the stiffener 300 may be warped. Conversely, when the stiffener 30 is formed of reinforced fiber, for example, carbon fiber, the stiffener 300 may be fractured due to intrinsic characteristics of the fiber, (i.e., brittleness), thereby protecting pedestrians and passengers.

In accordance with an exemplary embodiment of the present invention, when the coupling components 200 have a shape bent forwards from the respective brackets 110, the vertical pins 400 may pass through the coupling components 200 and the stiffener 300 and may connect the coupling components 200 and the stiffener 300 to each other. Alternatively, the vertical pins 400 fixed to the coupling components 200 may extend upwards, vertically pass through the stiffener 300 and may connect the coupling components 200 and the stiffener 300 to each other. When the coupling components 200 have a hook shape that extends from the respective brackets 110 and provide an aperture formed horizontally, the vertical pins 400 may pass through one side (e.g., first side) of each of the coupling components 200 and may then sequentially passing through the stiffener 300 and the other side (e.g., a second side) of each of the coupling components 200. Accordingly, the coupling components 200 and the stiffener 300 may be coupled to each other.

The exemplary embodiment may include a vehicle front structure having a stiffener 300 that collides with the pedestrian's legs when the front portion of the vehicle that collides with a pedestrian is coupled with the front bumper beam 100 via the vertical pins 400 that vertically pass through the stiffener 300. Additionally, an impact that may be generated by the collision with the pedestrian may be transmitted to the stiffener 300 to protect pedestrians and passengers within the vehicle. The coupling components 200 may include a first coupling components 210 formed in a band type that surround the stiffener 300 and detachably attach to the brackets 100.

Further, the vertical pins 400 may be first vertical pins 410 that pass through one side (e.g., a first side) of each of the first coupling components 210. The first vertical pins 410 may sequentially pass through the stiffener 300 and the other side (e.g., second side) of each of the first coupling components 210, and may protrude to the exterior. The first vertical pins 410 may be formed in the shape of a bolt. Further, the first nuts 510 may be coupled to the ends of the first vertical pins 410 that protrude to the exterior after passing through the first coupling components 210. Since the first coupling components 210 may be formed in a band type that surrounds the stiffener 300, as described above, the stiffener 300 and the first coupling components 210 may be coupled to each other.

Further, when the first vertical pins 410 are formed in the shape of a bolt, the first nuts 510 may be coupled with the ends of the first vertical pins 410 that protrude to the exterior after passing through the first coupling components 210. Moreover, the stiffener 300 and the first coupling components 210 may be coupled to each other. The first coupling components 210 may be detachably attached to the brackets 110. In particular, bolts may protrude forwards from the brackets 110 and may be connected to the first coupling components 210. The coupling nuts 20 may be coupled with the ends of the bolts. Further, since the first vertical pins 410 may be formed in a separable type from the coupling components 200, the stiffener 300 may be freely replaced with a new stiffener.

The coupling components 200 may include second coupling components 220 formed integrally with the brackets 110. Further, the second coupling components 220 may be positioned to bend vertically forward from the ends of the brackets 110. The vertical pins 400 may be second vertical pins 420 fixed to the second coupling components 220 and may extend upwards.

Further, the second nuts 520 may be coupled with the ends of the second vertical pins 420 that protrude to the exterior after passing through the stiffener 300. A fixing plate 530 may be disposed between the stiffener 300 and the second nut 520. When the second vertical pins 420 are fixed to the second coupling components 220 and extend upwards, as described above, the second vertical pins 420 may pass through the stiffener 300. Additionally, the second coupling components 220 may reduce assembly time, compared to the band-type first coupling components 210. After the second vertical pins 420 pass through the stiffener 300, the fixing plates 530 may be connected to the second vertical pins 420. Further, the second nuts 520 may be coupled with the ends of the second vertical pins 420, thereby firmly connecting the stiffener 300 to the brackets 110.

In the vehicle front structure in accordance with an exemplary embodiment, the stiffener 300 may include reinforced fiber. For example, various types of reinforced fiber may be used according to purposes of coupling structures to form the stiffener 300. In other words, at least one type of reinforced fiber selected from the group consisting of glass fiber, polyester fiber, polyolefin fiber, carbon fiber, para-aramid fiber, meta-aramid fiber, boron fiber, azole fiber and alumina fiber or the like may be used. In particular, carbon fiber may be used to provide strength and weight reduction of a vehicle frame. Further, carbon fiber may fracture when an impact at a designated level or greater is applied thereto due to brittleness of carbon fiber and may improve the protect pedestrians.

In some exemplary embodiments, the stiffener 300 formed of reinforced fiber may have a hollow pipe shape. In other words, the pipe-shaped stiffener 300 may be manufactured using reinforced fiber yarns using a drawing or extrusion process. In the vehicle front structure, the stiffener 300 may be formed in a hollow pipe shape. The cross-section of the stiffener 300 vertical to the length direction may be divided into a front portion 310 and a rear portion 320 based on the vehicle. For example, the front portion 310 may have a shape with a designated curvature. Further, the thickness of the front portion 310 may be greater than the thickness of the rear portion 320.

Generally, the stiffener 300 may be attached proximate to the lower end of a bumper cover 10 having a small space and may minimize the impact to the pedestrian's legs upon a collision of the vehicle with a pedestrian. Therefore, maximum strength and rigidity of the stiffener 300 within the small space is required. To achieve maximum strength and rigidity of the stiffener 300 within such a restricted space, a hollow pipe shape may provide an effective structure. Further, the hollow pipe-shaped stiffener 300 may be lightweight.

The front portion 310 of the cross-section of the stiffener 300 that contacts the pedestrian's legs may include a shape with a designated curvature to correspond to the shape of the bumper cover 10. The rear portion 320 may have a right-angled shape that corresponds to the bent portions formed by the brackets 110 and the coupling components 200, bent from the ends of the brackets 110 that extend forwards, to be coupled proximate to the bent portions. When the stiffener 300 is attached proximate to the bent components, separation of the stiffener 300 from the coupling components 200 may be prevented despite the impact generated by the collision. Further, since the impact generated by collision of the vehicle with a pedestrian may be transmitted from the front, to sufficiently absorb the impact, the thickness of the front portion 310 may be greater than the thickness of the rear portion 320.

In the vehicle front structure in accordance with an exemplary embodiment, the stiffener 300 may be attached proximate to the brackets 110 and the coupling components 200. When the stiffener 300 is attached proximate to the bent portions formed by the brackets 110 and the coupling components 200, bent from the ends of the brackets 110 and extends forwards, as described above, integration between the respective elements may be added. Accordingly, separation of the stiffener 300 from the coupling components 200 may be prevented despite impact generated by collision of the vehicle with a pedestrian.

However, when the stiffener 300 is formed of reinforced fiber, particularly, carbon fiber, galvanic corrosion (e.g., potentiometric corrosion) may occur. For example, a potential difference between the stiffener 300 and the brackets 110 and coupling components 220 formed of a steel member may facilitate galvanic corrosion. Therefore, an insulating material may be applied to the contact portions between the stiffener 300 and the brackets 110 and coupling components 200 to prevent galvanic corrosion. Further, in the same manner, the vertical pins 400 that pass through the stiffener 300 may be formed of an insulating material to prevent galvanic corrosion.

As is apparent from the above description, a vehicle front structure in accordance with an exemplary embodiment may couple a stiffener with a front bumper beam via vertical pins that vertically pass through the stiffener to maximally absorb the impact generated by collision of the vehicle with a pedestrian by the stiffener not by the front bumper beam. Thereby, safety of pedestrians and passengers within the vehicle may be assured.

While the present invention has been particularly shown and described with reference to exemplary embodiments thereof, it will be understood by those of ordinary skilled in the art will appreciate that various modifications, additions and substitutions are possible, without departing from the scope and spirit of the invention as disclosed in the accompanying claims. The exemplary embodiments should be considered in a descriptive sense only and not for purposes of limitation.

What is claimed is:

1. A vehicle front structure, comprising:
   a front bumper beam including a plurality of brackets that extend in the downward direction of a vehicle;
   coupling components that protrude forward from ends of the respective brackets;
   a stiffener disposed horizontally on the coupling components; and
   vertical pins that vertically pass through the stiffener from the coupling components,
   wherein the coupling components are formed in a band type that surrounds the stiffener and are removably coupled to the brackets, and
   wherein the vertical pins include first vertical pins that pass through a first side of each of the first coupling components, then sequentially pass through the stiffener and a second side of each of the first coupling components, and protrude to the exterior.

2. The vehicle front structure according to claim 1, wherein the first vertical pins are formed in the shape of a bolt and first nuts are coupled with the ends of the first vertical pins that protrude to the exterior after passing through the first coupling components.

3. The vehicle front structure according to claim 1, wherein:
   the coupling components include second coupling components formed integrally with the brackets and bent in a forward direction from the ends of the brackets, and
   the vertical pins include second vertical pins fixed to the second coupling components and extending in an upward direction.

4. The vehicle front structure according to claim 3, wherein second nuts are coupled with the ends of the second vertical pins that protrude to the exterior after passing through the stiffener, and a fixing plate is disposed between the stiffener and the second nut.

5. The vehicle front structure according to claim 1, wherein the stiffener includes a reinforced fiber material.

6. The vehicle front structure according to claim 1, wherein the stiffener is formed in a hollow pipe shape.

7. The vehicle front structure according to claim 6, wherein the cross-section of the stiffener vertical to the length direction is divided into a front portion and a rear portion based on the vehicle and the front portion has a shape having a curvature.

8. The vehicle front structure according to claim 7, wherein the thickness of the front portion is greater than the thickness of the rear portion.

9. The vehicle front structure according to claim 1, wherein the stiffener is attached proximate to the brackets and the coupling components.

* * * * *